(12) United States Patent
Kim

(10) Patent No.: US 11,480,918 B2
(45) Date of Patent: Oct. 25, 2022

(54) ACTIVE COMPLEX SPATIAL LIGHT MODULATION METHOD AND APPARATUS FOR AN ULTRA-LOW NOISE HOLOGRAPHIC DISPLAY

(71) Applicant: SAMSUNG ELECTRONICS CO., LTD., Suwon-si (KR)

(72) Inventor: Hwi Kim, Sejong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 197 days.

(21) Appl. No.: 16/562,371

(22) Filed: Sep. 5, 2019

(65) Prior Publication Data

US 2020/0278642 A1    Sep. 3, 2020

(30) Foreign Application Priority Data

Feb. 28, 2019    (KR) .......................... 10-2019-0023673

(51) Int. Cl.
*G02F 1/01*    (2006.01)
*G03H 1/22*    (2006.01)
(Continued)

(52) U.S. Cl.
CPC .......... *G03H 1/2294* (2013.01); *G02B 5/008* (2013.01); *G02F 1/025* (2013.01); *G03H 1/2202* (2013.01); *G03H 2001/2234* (2013.01); *G03H 2225/12* (2013.01); *G03H 2225/34* (2013.01); *G03H 2240/61* (2013.01)

(58) Field of Classification Search
CPC ............... G03H 1/2294; G03H 1/2202; G03H 2240/61; G03H 2225/12; G03H 2225/34; G03H 2225/33; G03H 2225/10; G03H 2225/22; G03H 2225/32;
(Continued)

(56) References Cited

U.S. PATENT DOCUMENTS 8,687,252 B2    4/2014   Leister et al.
9,244,268 B2 *  1/2016   Long .................. G02F 1/011
(Continued)

FOREIGN PATENT DOCUMENTS

EP         3 254 154 B1    5/2020
KR    10-2010-0038101 A    4/2010
(Continued)

OTHER PUBLICATIONS

Gun-Yeal Lee et al. "Complete amplitude and phase control of light using broadband holographic metasurfaces" The Royal Society of Chemistry, Nanoscale, vol. 10, 2018, (pp. 4237-4245).
(Continued)

*Primary Examiner* — Audrey Y Chang
(74) *Attorney, Agent, or Firm* — Sughrue Mion, PLLC

(57) ABSTRACT

Disclosed are an active complex spatial light modulation method and apparatus for an ultra-low noise holographic display. The active complex spatial light modulation apparatus includes a substrate and a petal antenna including three petal patterns arranged on the substrate, dividing a complex plane into three phase sections, and modulating the input light into three-phase amplitude values corresponding to the phase sections. The petal antenna may have a point symmetry shape based on the center point of the petal antenna.

8 Claims, 14 Drawing Sheets

(51) Int. Cl.
*G02B 5/00* (2006.01)
*G02F 1/025* (2006.01)

(58) Field of Classification Search
CPC . G03H 2001/0224; G02F 1/029; G02F 1/025; G02F 1/011; G02B 5/008
USPC .................. 359/237, 290, 291, 312, 241
See application file for complete search history.

(56) References Cited

U.S. PATENT DOCUMENTS

| | | | |
|---|---|---|---|
| 9,897,733 B2 | 2/2018 | Han et al. | |
| 10,102,814 B2 | 10/2018 | Missbach et al. | |
| 2010/0245980 A1* | 9/2010 | Miles | G09G 3/3466 359/291 |
| 2014/0055692 A1 | 2/2014 | Kroll et al. | |
| 2014/0158198 A1* | 6/2014 | Simovski | B82Y 20/00 438/69 |
| 2016/0223723 A1* | 8/2016 | Han | G02B 5/008 |
| 2017/0184881 A1* | 6/2017 | Loertscher | G02F 1/025 |
| 2019/0018299 A1 | 1/2019 | Park et al. | |

FOREIGN PATENT DOCUMENTS

| | | |
|---|---|---|
| KR | 10-2012-0115201 A | 10/2012 |
| KR | 10-2015-0064185 A | 6/2015 |
| KR | 10-2015-0131884 A | 11/2015 |
| KR | 10-2016-0096527 A | 8/2016 |
| KR | 10-2018-0093796 A | 8/2018 |
| KR | 10-2019-0007755 A | 1/2019 |
| WO | 2016/126896 A1 | 8/2016 |

OTHER PUBLICATIONS

Communication dated Dec. 30, 2019, issued by the Korean Intellectual Property Office in corresponding Korean Application No. 10-2019-0023673.

International Search Report dated Dec. 2, 2019 issued by the International Searching Authority in counterpart International Application No. PCT/KR2019/010963 (PCT/ISA/210).

Communication dated May 30, 2022, issued by the Korean Intellectual Property Office in Korean Patent English Application No. 10-2020-0141457.

* cited by examiner

ACTIVE COMPLEX SPATIAL LIGHT MODULATION METHOD AND APPARATUS FOR AN ULTRA-LOW NOISE HOLOGRAPHIC DISPLAY

CROSS REFERENCE TO RELATED APPLICATION

This application is based on and claims priority under 35 U.S.C. 119 to Korean Patent Application No. 10-2019-0023673, filed on Feb. 28, 2019, in the Korean Intellectual Property Office, the disclosures of which is herein incorporated by reference in their entireties.

BACKGROUND OF THE INVENTION

1. Technical Field

Various embodiments relate to an active complex spatial light modulation method and apparatus for an ultra-low noise holographic display.

2. Description of the Related Art

A hologram has been known as the principle of the most perfect 3D display having both binocular parallax and monocular parallax effects, that is, elements that a person can feel a three-dimensional (3-D) effect. Research of a holographic display based on such a principle is actively carried out worldwide. The holographic display reproduces a 3-D image based on the phase and amplitude of input light.

SUMMARY OF THE INVENTION

However, a holographic display, such as that described above, displays an image by modulating any one of the phase or amplitude of light. Accordingly, there is a problem in that an image displayed on the holographic display includes noise. In order to solve such a problem, the holographic display may be equipped with a filtering optical system for removing noise. However, if the holographic display includes the filtering optical system, there is a limit in achieving a reduction in the size, a reduction in the weight, light and thinness, and mobility of the holographic display. Accordingly, there is a need for a method for enabling a holographic display to display an image without noise even without including a filtering optical system.

According to various embodiments, an active complex spatial light modulation apparatus is for an ultra-low noise holographic display, and includes a substrate and a petal antenna including three petal patterns arranged on the substrate, dividing a complex plane into three phase sections, and modulating the input light into three-phase amplitude values corresponding to the phase sections. The petal antenna may have a point symmetry shape based on the center point of the petal antenna.

According to various embodiments, an operating method of an active complex spatial light modulation apparatus is for an ultra-low noise holographic display, and includes detecting, by a petal antenna including three petal patterns arranged on a substrate, light input to a center point of the petal antenna and modulating, by the petal antenna, the input light into three-phase amplitude values corresponding to three phase sections divided from a complex plane through the petal patterns. The petal antenna may have a point symmetry shape based on the center point.

According to various embodiments, a pixel structure of an active complex spatial light modulation apparatus is for an ultra-low noise holographic display, and includes a substrate and a petal antenna including three petal patterns arranged on the substrate, dividing a complex plane into three phase sections, and modulating the input light into three-phase amplitude values corresponding to the phase sections. The petal antenna may have a point symmetry shape based on the center point of the petal antenna.

BRIEF DESCRIPTION OF THE DRAWINGS

FIGS. 4, 5, 6, 7, 8, 9 and 10 are diagrams for illustrating the valid width section and valid length section of petal patterns in the active complex spatial light modulation apparatus according to various embodiments.

DETAILED DESCRIPTION

Figure 1:
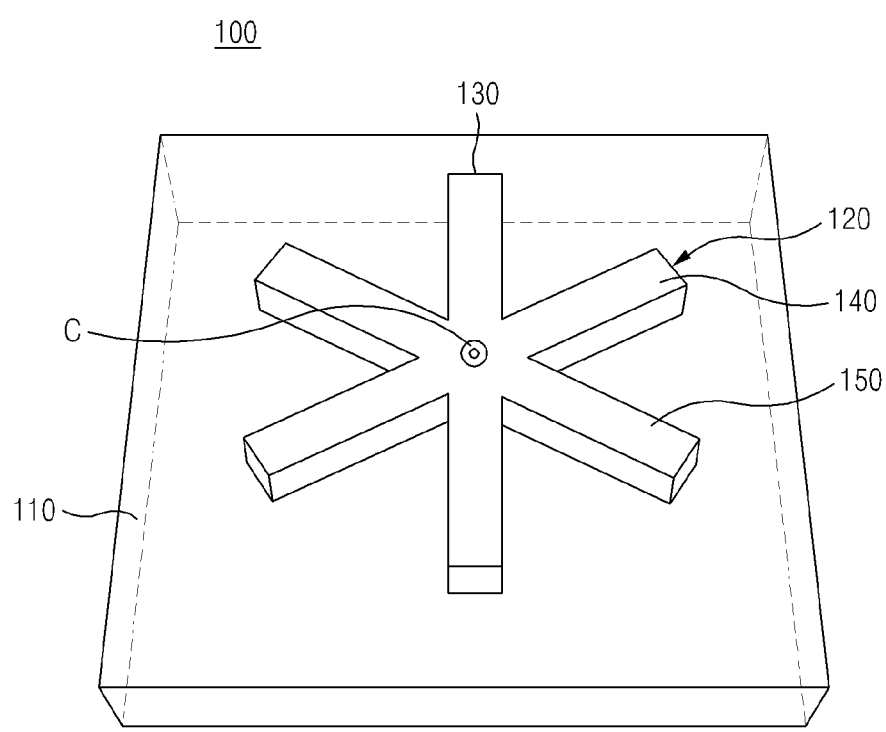
FIG. 1 is a diagram showing an active complex spatial light modulation apparatus according to various embodiments.

Hereinafter, various embodiments of this document are described in detail with reference to the accompanying drawings.

The embodiments of this document and the terms used in the embodiments are not intended to limit the technology described in this document to a specific embodiment, but should be construed as including various changes, equivalents and/or alternatives of a corresponding embodiment. Regarding the description of the drawings, similar reference numerals may be used in similar elements. An expression of the singular number may include an expression of the plural number unless clearly defined otherwise in the context. In this document, an expression, such as "A or B", "at least one of A or/and B", "A, B or C" or "at least one of A, B and/or C", may include all of possible combinations of listed items together. Expressions, such as "a first," "a second," "the first" and "the second", may modify corresponding elements regardless of the sequence and/or importance, and are used to only distinguish one element from the other element and do not limit corresponding elements. When it is described that one (e.g., first) element is "(operatively or communicatively) connected to" or "coupled with" the other (e.g., second) element, one element may be directly connected to the other element or may be connected to the other element through another element (e.g., third element).

According to various embodiments, a holographic display may display an ultra-low noise 3-D image using an active complex spatial light modulation apparatus. The active complex spatial light modulation apparatus may be configured to control the phase and amplitude of light related to the image. The active complex spatial light modulation apparatus may be configured to modulate the input light into amplitude values of three phases corresponding to three phase sections.

Figure 2:
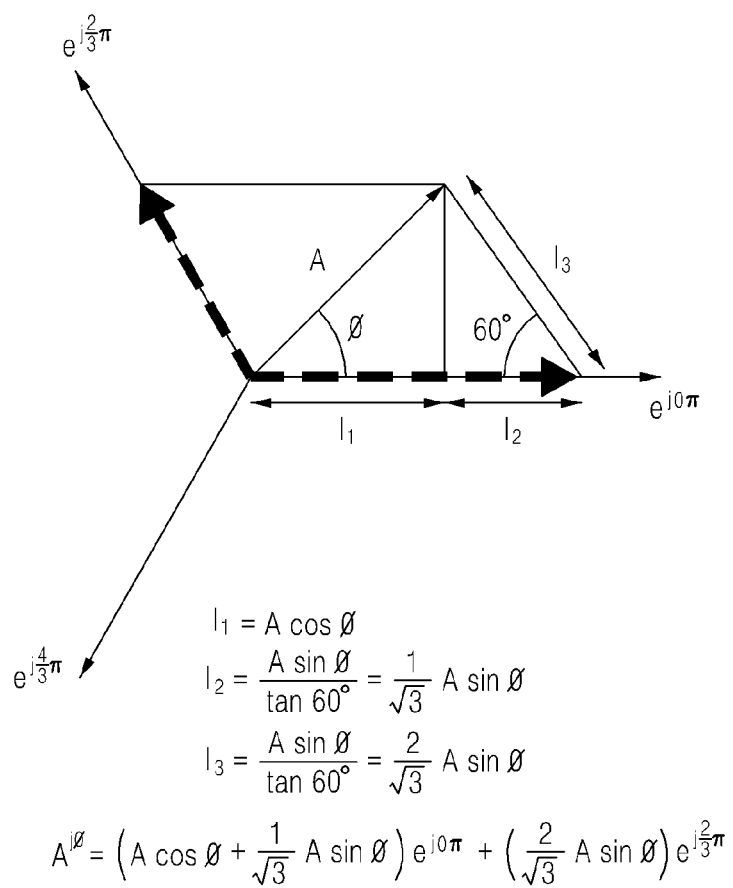
FIG. 2 is a diagram for illustrating the design principle of the active complex spatial light modulation apparatus according to various embodiments.
Figure 3:
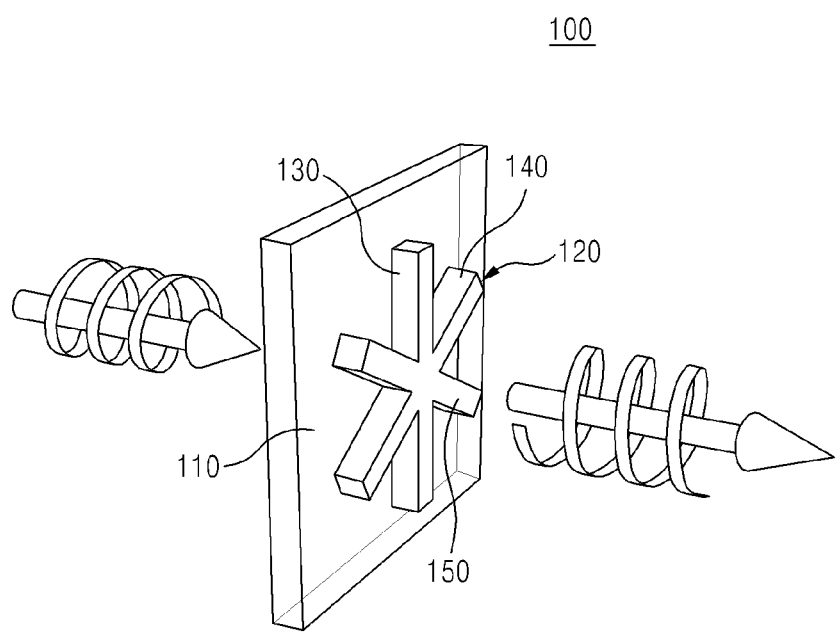
FIG. 3 is a diagram for illustrating an operating method of the active complex spatial light modulation apparatus according to various embodiments.

FIG. 1 is a diagram showing an active complex spatial light modulation apparatus 100 according to various embodiments. FIG. 2 is a diagram for illustrating the design principle of the active complex spatial light modulation apparatus 100 according to various embodiments. FIG. 3 is a diagram for illustrating an operating method of the active complex spatial light modulation apparatus 100 according to various embodiments.

Referring to FIG. 1, the active complex spatial light modulation apparatus 100 according to various embodiments is implemented in a pixel structure form, and may include a substrate 110 and a petal antenna 120 having a point symmetry configuration.

The substrate 110 may support the petal antenna 120. For example, the substrate 110 may be made of a silicon dioxide material. The substrate 110 may include a first face, a second face, and a third face connecting the first face and the second face. For example, light related to an image may pass from the first face to the second face.

The petal antenna 120 may be positioned in the substrate 110. For example, the petal antenna 120 may be positioned in the second face of the substrate 110. Accordingly, light related to an image may be input from the substrate 110 to the petal antenna 120. Furthermore, the petal antenna 120 may modulate the phase and amplitude of the input light at the same time. In this case, the petal antenna 120 may have a point symmetry shape on the basis of the center point C of the petal antenna 120.

Petal patterns 130, 140, and 150 may divide a complex plane into three phase sections, and may represent input light as amplitude values $A_1$, $A_2$, and $A_3$ of three phases corresponding to the phase sections. To this end, the petal antenna 120 may include the three petal patterns 130, 140, and 150. Each of the petal patterns 130, 140, and 150 may have a point symmetry shape on the basis of the center point C. The petal patterns 130, 140, and 150 may interact at the center point C. For example, the petal patterns 130, 140, and 150 may be tilted mutually by 120°. In this case, the amplitude values $A_1$, $A_2$, and $A_3$ may be determined based on the sizes of the petal patterns 130, 140, and 150. For example, each of the amplitude values $A_1$, $A_2$, and $A_3$ may be adjusted by at least any one of the width or length of each of the petal patterns 130, 140, and 150.

If an active operation is performed, an element (e.g., LCD) for modulating the amplitude of a light wave actively may be attached to the petal element (i.e., wing) part of each of the fixed petal patterns 130, 140, and 150, and the amplitude of each of the three petal patterns 130, 140, and 150 may be adjusted.

The petal patterns 130, 140, and 150 may include a first petal pattern 130, a second petal pattern 140, and a third petal pattern 150 corresponding to the phase sections, respectively. For example, the second petal pattern 140 may be tilted clockwise by 120° from the first petal pattern 130. The third petal pattern 150 may be tilted clockwise by 120° from the second petal pattern 140. The phase sections may include a first phase section, a second phase section and a third phase section. For example, the first phase section may correspond to at least some section of 0° to 120°, the second phase section may correspond to at least some section of 120° to 240°, and the third phase section may correspond to at least some section of 240° to 360°. The amplitude values $A_1$, $A_2$, and $A_3$ may include a first amplitude value $A_1$, a second amplitude value $A_2$, and a third amplitude value $A_3$. In this case, the petal patterns 130, 140, and 150 may be designed to satisfy Equation 1 below based on a principle, such as that shown in FIG. 2.

$$0° < \phi < 120°$$
$$A_1 = \cos(\phi) + \frac{1}{\sqrt{3}}\sin(\phi)$$
$$A_2 = \frac{2}{\sqrt{3}}\sin(\phi)$$
$$A_2 = 0$$
$$120° < \phi < 240°$$
$$A_1 = 0$$
$$A_2 = \cos(\phi - 120°) + \frac{1}{\sqrt{3}}\sin(\phi - 120°)$$
$$A_3 = \frac{2}{\sqrt{3}}\sin(\phi - 120°)$$
$$240° < \phi < 260°$$
$$A_1 = \frac{2}{\sqrt{3}}\sin(\phi - 240°)$$
$$A_2 = 0$$
$$A_3 = \cos(\phi - 240°) + \frac{1}{\sqrt{3}}\sin(\phi - 240°)$$

[Equation 1]

The first petal pattern 130 may detect the first phase section from input light, and may represent the input light as the first amplitude value $A_1$ corresponding to the first phase section.

If each of the petal patterns 130, 140, and 150 performs an active operation, the amplitude of each of the three petal patterns 130, 140, and 150 needs to be adjusted by attaching an element (e.g., LCD) for actively modulating the amplitude of a light wave to the petal element (i.e., wing) part of each of the fixed petal patterns 130, 140, and 150. Each of the petal patterns 130, 140, and 150 may include at least two petal elements. In each of the petal patterns 130, 140, and 150, the petal elements may be arranged in a point symmetry form on the basis of a center point C. For example, the petal elements may be arranged to be extended in a radial shape from the center point C. For example, if each of the petal patterns 130, 140, and 150 includes two petal elements, the petal antenna 120 may be implemented as a hexa petal structure. According to an embodiment, at least any one of the petal patterns 130, 140, and 150 may be connected at the center point C. For example, at least any one of the petal patterns 130, 140, and 150 may have a rod shape that penetrates the center point C. According to another embodiment, at least any one of the petal patterns 130, 140, and 150 may be spaced apart from each other with the center point C interposed therebetween. For example, at least any one of the petal patterns 130, 140, and 150 may be positioned on the side opposite the other petal pattern with the center point C interposed therebetween. According to various embodiments, the active complex spatial light modulation apparatus 100 may represent input light as three-phase amplitude values $A_1$, $A_2$, and $A_3$ based on three phase sections divided from a complex plane, and may then combine the three-phase amplitude values $A_1$, $A_2$, and $A_3$ into a single complex value. In this case, the input light may be generated in a right circular polarization (RCP) or left circular polarization (LCP) form as a phase difference between an x-axis component and y-axis component of coherent light occurs. As shown in FIG. 3, when the petal antenna 120 detects input light, the petal antenna 120 may modulate the input light as three-phase amplitude values $A_1$, $A_2$, and $A_3$, corresponding to three phase sections divided from a complex plane, through the petal patterns 130, 140, and 150. In this case, the petal antenna 120 may modulate the phase difference between the x-axis component and y-axis component of the coherent light, passing through the petal antenna 120, in a cross polarization component contrary to the input light.

If each of the petal patterns 130, 140, and 150 perform a passive operation, that is, if each petal pattern generates a fixed 3-D hologram image, a first amplitude value $A_1$ may be determined based on the size of the first petal pattern 130. For example, the first amplitude value $A_1$ may be adjusted by at least any one of the width or length of the first petal pattern 130. The second petal pattern 140 may detect a second phase section from input light, and may represent the input light as a second amplitude value $A_2$ corresponding to the second phase section. The second amplitude value $A_2$ may be determined based on the size of the second petal pattern 140. For example, the second amplitude value $A_2$ may be adjusted by at least any one of the width or length of the second petal pattern 140. The third petal pattern 150 may detect a third phase section from the input light, and may represent the input light as a third amplitude value $A_3$ corresponding to the third phase section. The third amplitude value $A_3$ may be determined based on the size of the third petal pattern 150. For example, the third amplitude value $A_3$ may be adjusted by at least any one of the width or length of the third petal pattern 150.

Figure 4:
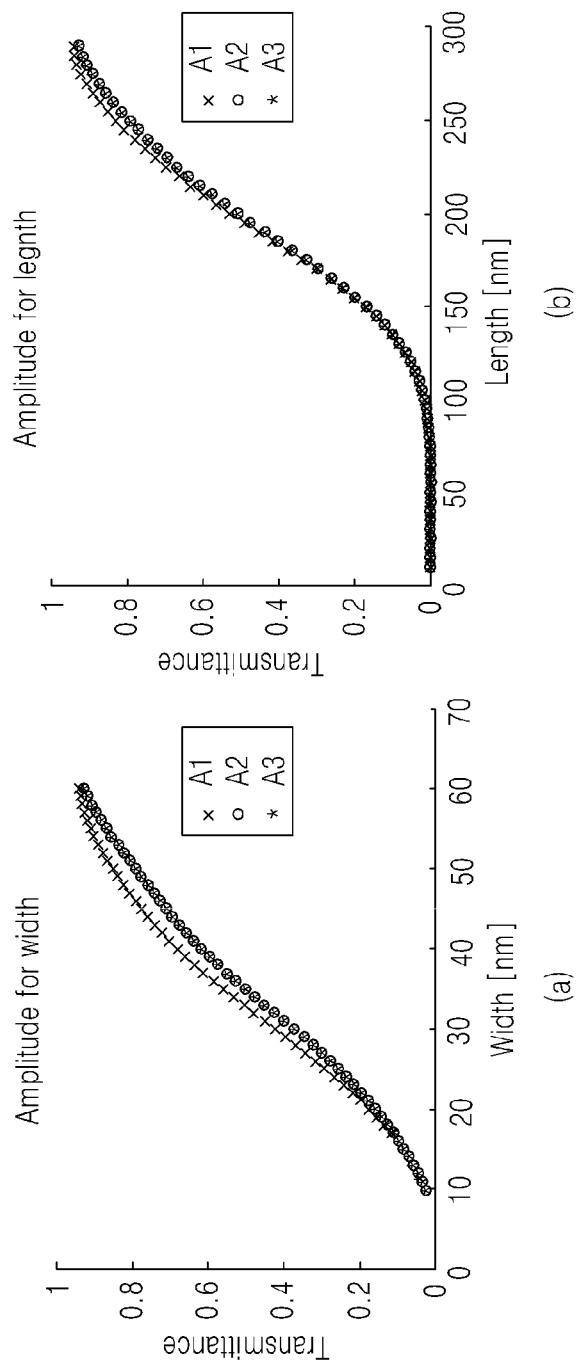
FIGS. 4, 5 and 6 are diagrams for illustrating the characteristics of the active complex spatial light modulation apparatus according to various embodiments.
Figure 5:
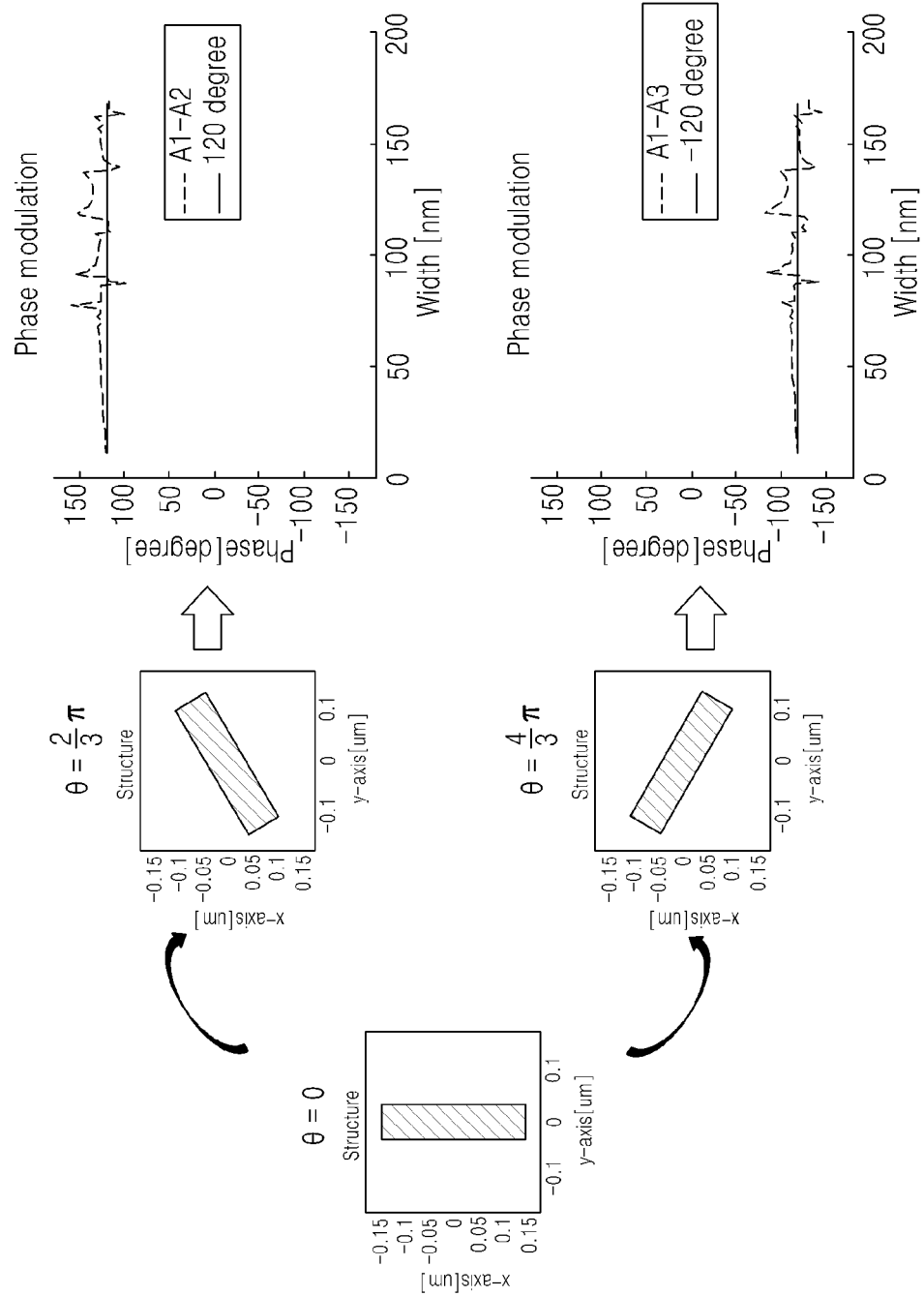
Figure 6:
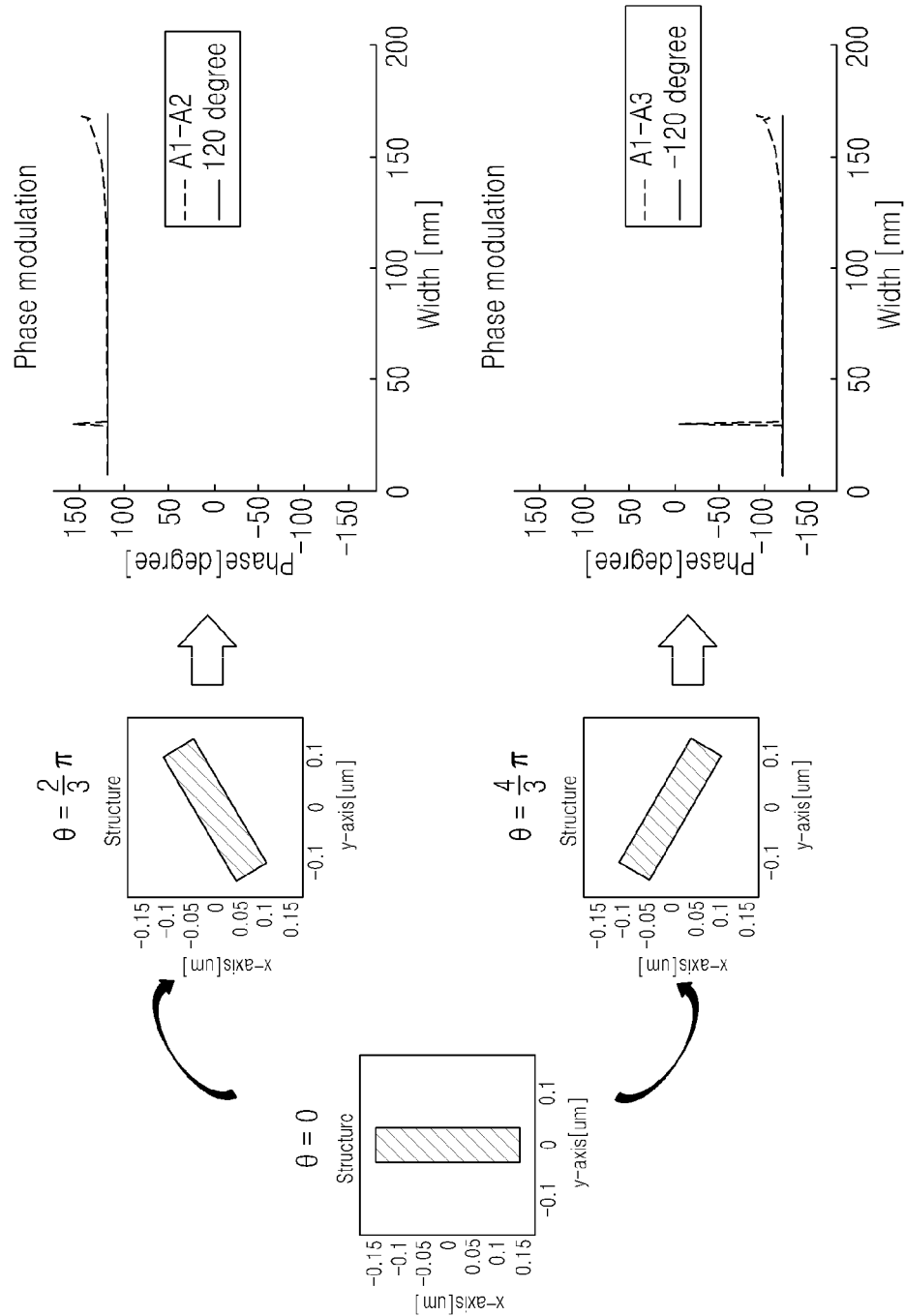
Figure 7:
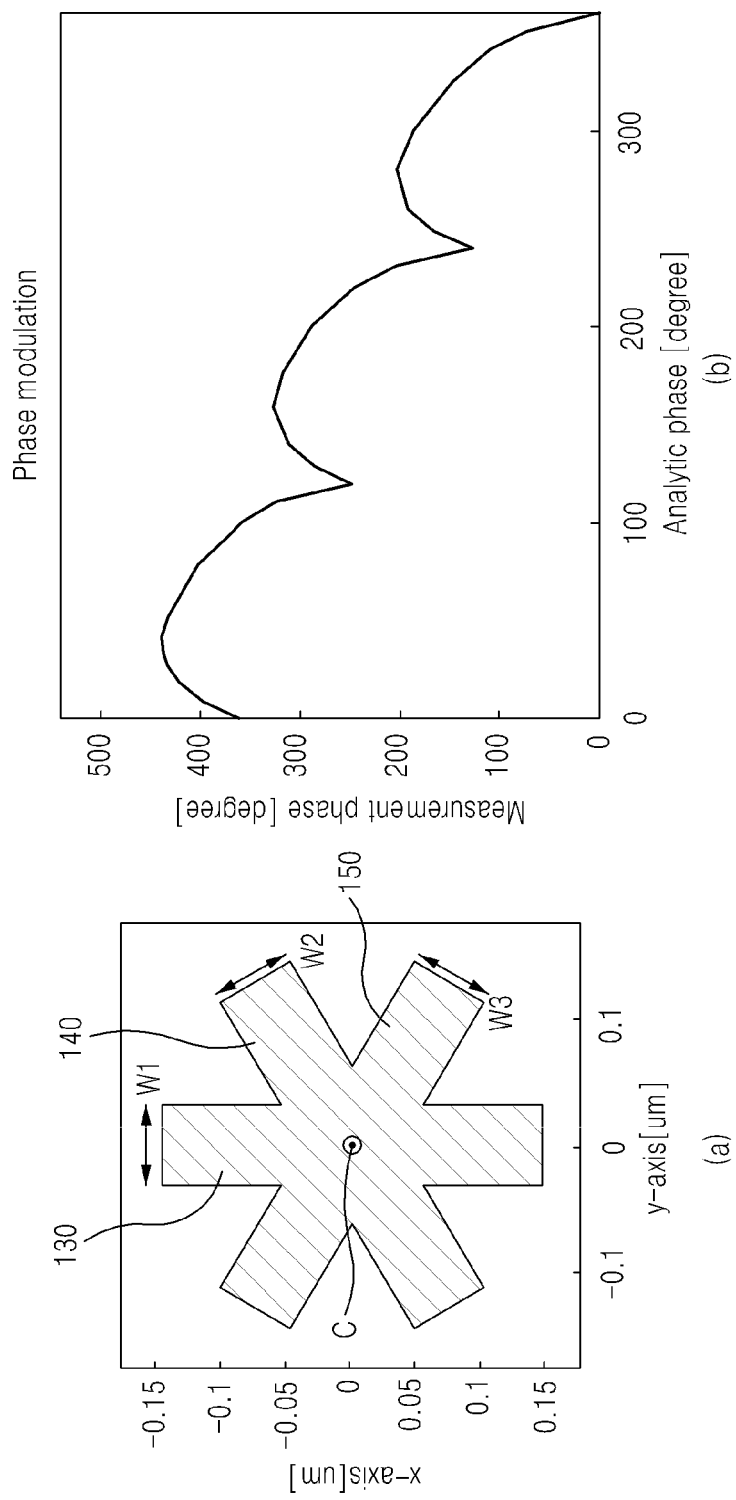
Figure 8:
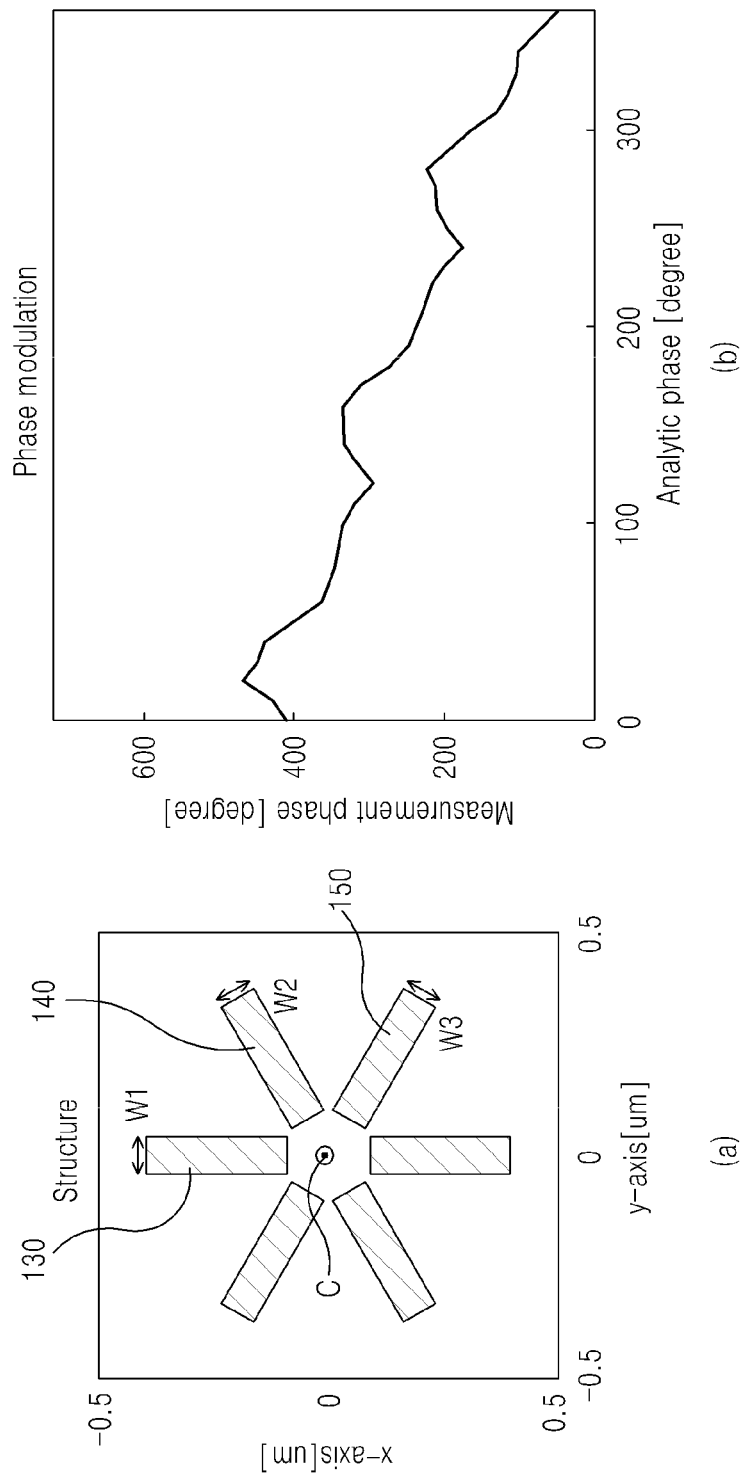
Figure 9:
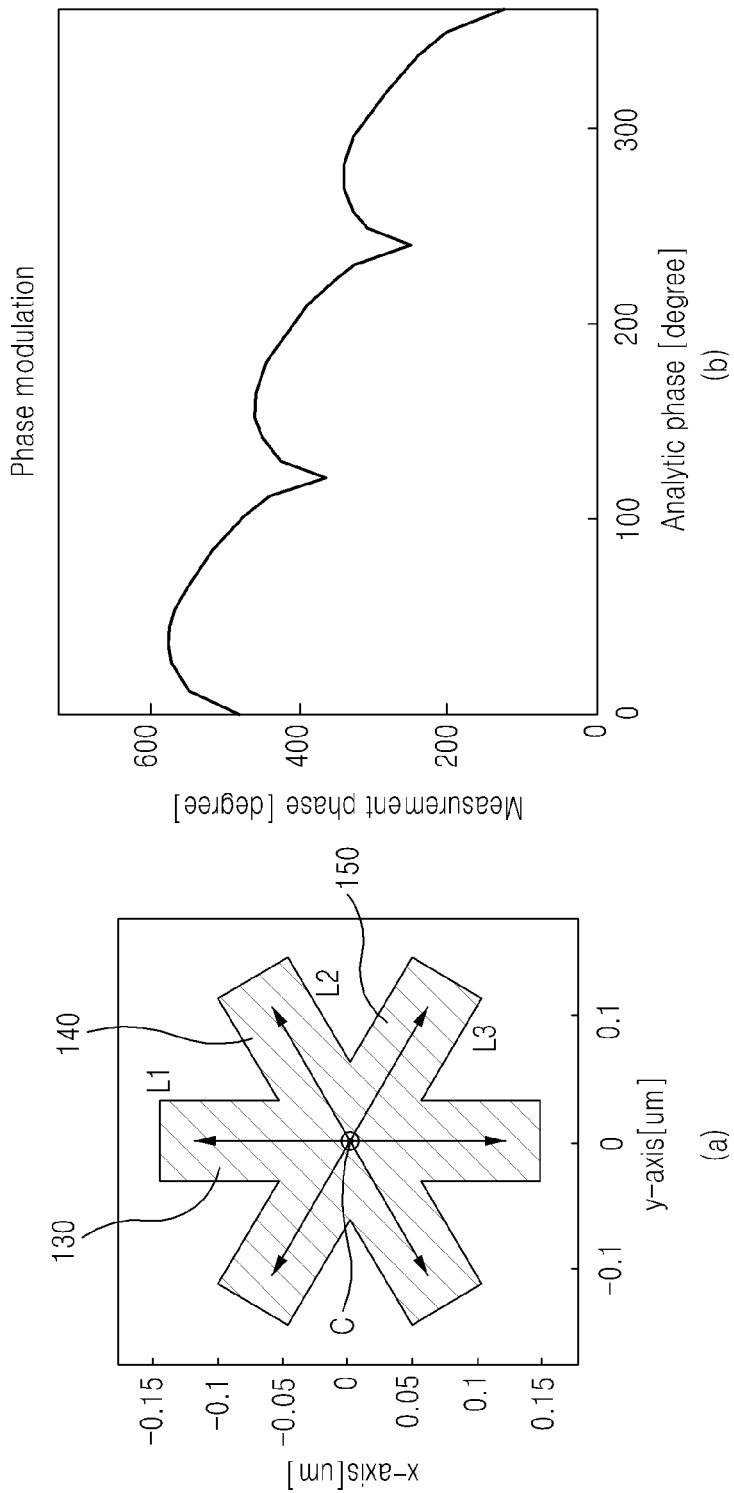
Figure 10:
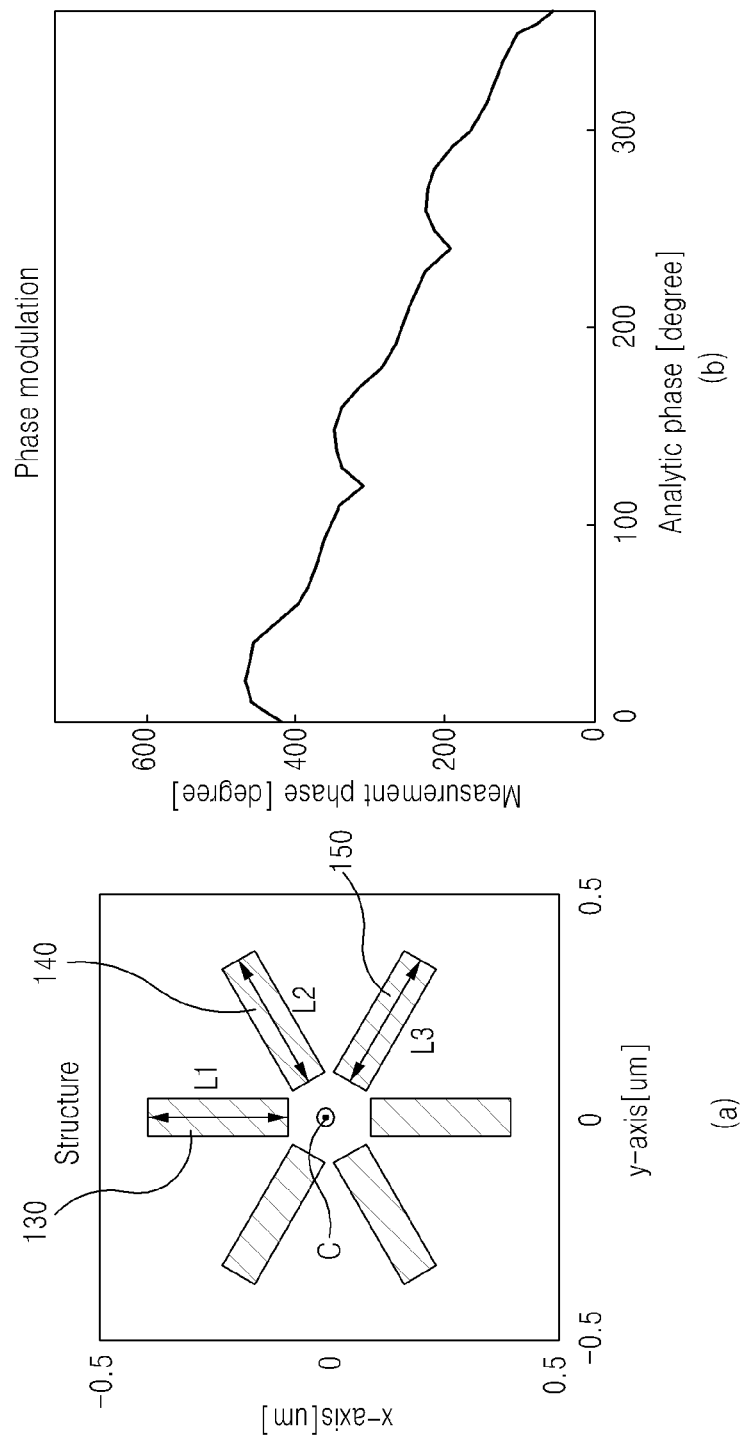

FIGS. 4, 5, 6, 7, 8, 9 and 10 are diagrams for illustrating the valid width sections and valid length sections of the petal patterns 130, 140, and 150 in the visible ray passive complex spatial light modulation apparatus 100 according to various embodiments. FIG. 4 illustrates the valid width sections and valid length sections of the petal patterns 130, 140, and 150. In this case, FIG. 4 may illustrate the valid width sections and valid length sections of the petal patterns 130, 140, and 150 if a total pixel cycle is 350 nm. FIGS. 5 and 6 are diagrams illustrating the verification results of the valid width sections and valid length sections of FIG. 4. FIGS. 7, 8, 9 and 10 are diagrams illustrating the modulation results of the petal patterns 130, 140, and 150 based on the valid width sections and valid length sections of FIG. 4.

Referring to FIG. 4, the valid width section and valid length section of each of the petal patterns 130, 140, and 150 may be defined. The amplitude values $A_1$, $A_2$, and $A_3$ of the petal patterns 130, 140, and 150 may be determined based on the size of the petal patterns 130, 140, and 150. In this case, each of the amplitude values $A_1$, $A_2$, and $A_3$ may be adjusted by at least any one of the width or length of the petal patterns 130, 140, and 150. The valid width sections of all the petal patterns 130, 140, and 150 may be the same as those shown in FIG. 4(a), and the valid length sections of all the petal patterns 130, 140, and 150 may be the same as those shown in FIG. 4(b). In this case, in the valid width sections of the petal patterns 130, 140, and 150, a phase difference between cross polarization components passing through the respective petal patterns 130, 140, and 150 is 120° as shown in FIG. 5. In the valid length sections of the petal patterns 130, 140, and 150, a phase difference between the cross polarization components passing through the respective petal patterns 130, 140, and 150 is 120° as shown in FIG. 6. For example, the width of each of the petal patterns 130, 140, and 150 may be adjusted to any one value of approximately 0 nm to 60 nm. The length of each of the petal patterns 130, 140, and 150 may be adjusted to any one value of approximately 0 nm to 290 nm.

For example, in the valid width sections of the petal patterns 130, 140, and 150, each of the widths W1, W2, and W3 of the petal patterns 130, 140, and 150 for representing each of the amplitude values $A_1$, $A_2$, and $A_3$ as 0.8 may be determined as in Table 1 based on a phase interval of 10°. According to a first embodiment, as shown in FIG. 7(a), each of the petal patterns 130, 140, and 150 may include two petal elements, and the petal elements of the petal patterns 130, 140, and 150 may be interconnected at the center point C. In this case, each of the widths W1, W2, and W3 of the petal patterns 130, 140, and 150 may be determined based on Table 1. According to the first embodiment, the modulation results of the petal patterns 130, 140, and 150 may show continuity in the phase sections, as shown in FIG. 7(b). According to a second embodiment, as shown in FIG. 8(a), each of the petal patterns 130, 140, and 150 may include two petal elements, and the petal elements of the petal patterns 130, 140, and 150 may be spaced apart from each other with the center point C interposed therebetween. In this case, each of the widths W1, W2, and W3 of the petal patterns 130, 140, and 150 may be determined based on Table 1. According to the second embodiment, the modulation results of the petal patterns 130, 140, and 150 may show further improved continuity in the phase sections, as shown in FIG. 8(b).

TABLE 1

| Analytic | | W1 | W2 | W3 | Analytic | | W1 | W2 | W3 | Analytic | | W1 | W2 | W3 |
| --- | --- | --- | --- | --- | --- | --- | --- | --- | --- | --- | --- | --- | --- | --- |
| Amp | Phase | [nm] | [nm] | [nm] | Amp | Phase | [nm] | [nm] | [nm] | Amp | Phase | [nm] | [nm] | [nm] |
| 0.8 | 0 | 43 | 0 | 0 | 0.8 | 120 | 0 | 47 | 0 | 0.8 | 240 | 0 | 0 | 47 |
| 0.8 | 10 | 47 | 19 | 0 | 0.8 | 130 | 0 | 51 | 19 | 0.8 | 250 | 19 | 0 | 51 |
| 0.8 | 20 | 50 | 27 | 0 | 0.8 | 140 | 0 | 54 | 27 | 0.8 | 260 | 25 | 0 | 54 |
| 0.8 | 30 | 51 | 32 | 0 | 0.8 | 150 | 0 | 54 | 32 | 0.8 | 270 | 30 | 0 | 54 |
| 0.8 | 40 | 50 | 37 | 0 | 0.8 | 160 | 0 | 54 | 37 | 0.8 | 280 | 35 | 0 | 54 |
| 0.8 | 50 | 47 | 42 | 0 | 0.8 | 170 | 0 | 51 | 42 | 0.8 | 290 | 39 | 0 | 51 |
| 0.8 | 60 | 43 | 47 | 0 | 0.8 | 180 | 0 | 47 | 47 | 0.8 | 300 | 43 | 0 | 47 |
| 0.8 | 70 | 39 | 51 | 0 | 0.8 | 190 | 0 | 42 | 51 | 0.8 | 310 | 47 | 0 | 42 |
| 0.8 | 80 | 35 | 54 | 0 | 0.8 | 200 | 0 | 37 | 54 | 0.8 | 320 | 50 | 0 | 37 |
| 0.8 | 90 | 30 | 54 | 0 | 0.8 | 210 | 0 | 32 | 54 | 0.8 | 330 | 51 | 0 | 32 |
| 0.8 | 100 | 25 | 54 | 0 | 0.8 | 220 | 0 | 27 | 54 | 0.8 | 340 | 50 | 0 | 27 |
| 0.8 | 110 | 19 | 51 | 0 | 0.8 | 230 | 0 | 19 | 51 | 0.8 | 350 | 47 | 0 | 19 |

For example, in the valid length sections of the petal patterns 130, 140, and 150, each of the lengths L1, L2, and L3 of the petal patterns 130, 140, and 150 for representing each of the amplitude values $A_1$, $A_2$, and $A_3$ as 0.8 may be determined as in Table 2 based on a phase interval of 10°. According to a first embodiment, as shown in FIG. 9(a), each of the petal patterns 130, 140, and 150 may include two petal elements, and the petal elements of the petal patterns 130, 140, and 150 may be interconnected at the center point C. In this case, the lengths L1, L2, and L3 of the petal patterns 130, 140, and 150 may be determined based on Table 2. According to the first embodiment, the modulation results of the petal patterns 130, 140, and 150 may show continuity in the phase sections as shown in FIG. 9(b). According to a second embodiment, as shown in FIG. 10(a), each of the petal patterns 130, 140, and 150 may include two petal elements, and the petal elements of the petal patterns 130, 140, and 150 may be spaced apart from each other with the center point C interposed therebetween. In this case, the lengths L1, L2, and L3 of the petal patterns 130, 140, and 150 may be determined based on Table 2. According to the second embodiment, the modulation results of the petal patterns 130, 140, and 150 may show further improved continuity in the phase sections as shown in FIG. 10(b).

modulation apparatus 100 can represent the amplitude values $A_1$, $A_2$, and $A_3$ by combining them into a single complex value. Accordingly, a holographic display may display an ultra-low noise image using the active complex spatial light modulation apparatus 100. That is, holographic display can display an image clearly without noise.

Figure 12:
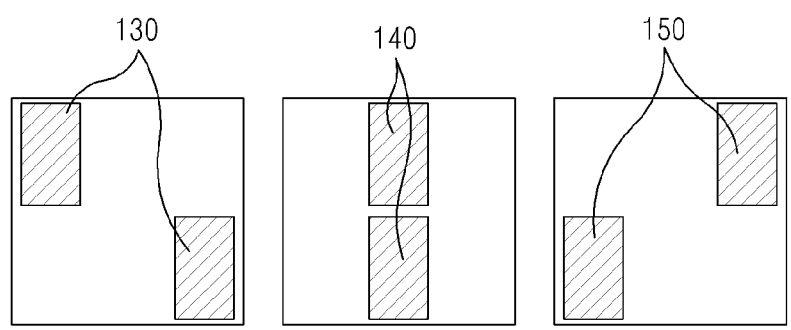
FIGS. 12, 13 and 14 are diagrams for illustrating performance of the active complex spatial light modulation apparatus according to another embodiment.
Figure 13:
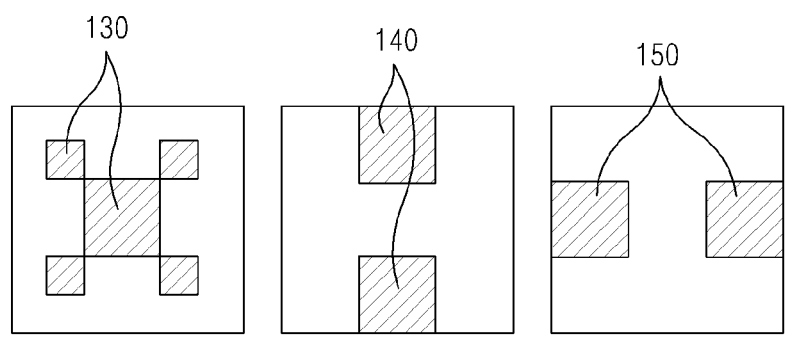
Figure 14:
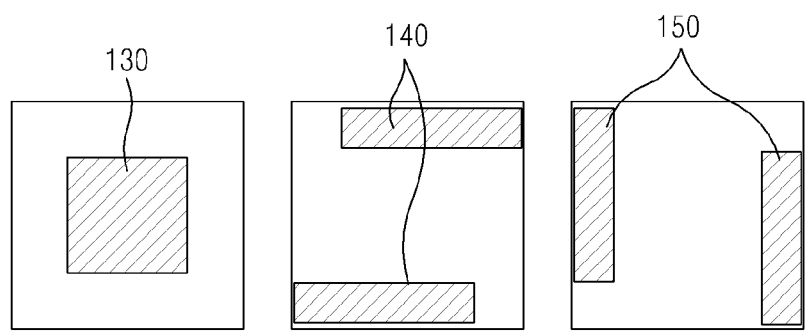

FIGS. 12, 13 and 14 are diagrams for illustrating performance of the active complex spatial light modulation apparatus 100 according to another embodiment. Referring to FIGS. 12, 13 and 14, each of the petal patterns 130, 140, and 150 of the active complex spatial light modulation apparatus 100 according to another embodiment may include at least two petal elements. Each of the petal patterns 130, 140, and 150 may have a point symmetry shape on the basis of a center point C. The petal patterns 130, 140, and 150 may intersect at the center point C. In some embodiments, at least any one of the petal patterns 130, 140, and 150 may be spaced apart from each other with the center point C interposed therebetween. In some embodiments, at least any one of the petal patterns 130, 140, and 150 may be interconnected at the center point C.

TABLE 2

| Analytic | | L1 | L2 | L3 | Analytic | | L1 | L2 | L3 | Analytic | | L1 | L2 | L3 |
|---|---|---|---|---|---|---|---|---|---|---|---|---|---|---|
| Amp | Phase | [nm] | [nm] | [nm] | Amp | Phase | [nm] | [nm] | [nm] | Amp | Phase | [nm] | [nm] | [nm] |
| 0.8 | 0 | 235 | 0 | 0 | 0.8 | 120 | 0 | 241 | 0 | 0.8 | 240 | 0 | 0 | 241 |
| 0.8 | 10 | 247 | 146 | 0 | 0.8 | 130 | 0 | 255 | 146 | 0.8 | 250 | 146 | 0 | 255 |
| 0.8 | 20 | 255 | 170 | 0 | 0.8 | 140 | 0 | 265 | 170 | 0.8 | 260 | 169 | 0 | 265 |
| 0.8 | 30 | 258 | 189 | 0 | 0.8 | 150 | 0 | 269 | 189 | 0.8 | 270 | 187 | 0 | 269 |
| 0.8 | 40 | 255 | 207 | 0 | 0.8 | 160 | 0 | 265 | 207 | 0.8 | 280 | 204 | 0 | 265 |
| 0.8 | 50 | 247 | 225 | 0 | 0.8 | 170 | 0 | 255 | 225 | 0.8 | 290 | 220 | 0 | 255 |
| 0.8 | 60 | 235 | 241 | 0 | 0.8 | 180 | 0 | 241 | 241 | 0.8 | 300 | 235 | 0 | 241 |
| 0.8 | 70 | 220 | 255 | 0 | 0.8 | 190 | 0 | 225 | 255 | 0.8 | 310 | 247 | 0 | 225 |
| 0.8 | 80 | 204 | 265 | 0 | 0.8 | 200 | 0 | 207 | 265 | 0.8 | 320 | 255 | 0 | 207 |
| 0.8 | 90 | 187 | 269 | 0 | 0.8 | 210 | 0 | 189 | 269 | 0.8 | 330 | 258 | 0 | 189 |
| 0.8 | 100 | 169 | 265 | 0 | 0.8 | 220 | 0 | 170 | 265 | 0.8 | 340 | 255 | 0 | 170 |
| 0.8 | 110 | 146 | 255 | 0 | 0.8 | 230 | 0 | 146 | 255 | 0.8 | 350 | 247 | 0 | 146 |

Figure 11:
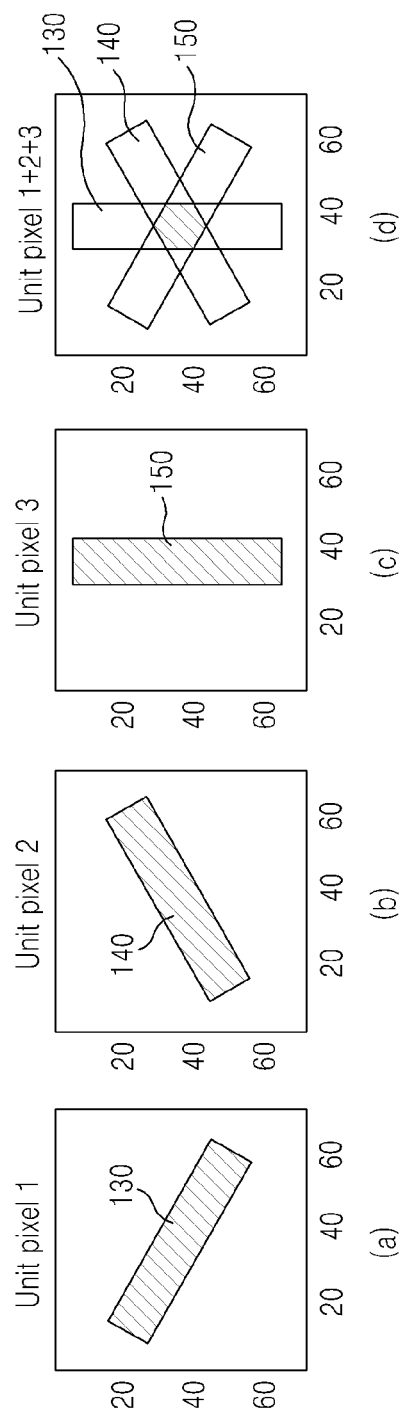
FIG. 11 is a diagram for illustrating performance of the active complex spatial light modulation apparatus according to an embodiment.

FIG. 11 is a diagram for illustrating performance of the active complex spatial light modulation apparatus 100 according to an embodiment.

Referring to FIG. 11, each of the petal patterns 130, 140, and 150 of the active complex spatial light modulation apparatus 100 according to an embodiment may include two petal elements. The petal elements of the petal patterns 130, 140, and 150 may be interconnected at the center point C. Each of the petal patterns 130, 140, and 150 may have a point symmetry shape on the basis of a center point C. The petal patterns 130, 140, and 150 may intersect at the center point C.

As shown in FIG. 11(a), the first petal pattern 130 may detect a first phase section from input light, and may represent the input light as a first amplitude value $A_1$ corresponding to the first phase section. As shown in FIG. 11(b), the second petal pattern 140 may detect a second phase section, delayed by 120° from the first phase section, from the input light, and may represent the input light as a second amplitude value $A_2$ corresponding to the second phase section. As shown in FIG. 11(c), the third petal pattern 150 may detect a third phase section, delayed by 120° from the second phase section, from the input light, and may represent the input light as a third amplitude value $A_3$ corresponding to the third phase section.

Accordingly, as shown in FIG. 11(d), the petal patterns 130, 140, and 150 of the active complex spatial light The petal elements include all of wide phase delay structures capable of producing three-phase (e.g., 0°, 120°, 240°) phase delay.

As shown in FIGS. 12(a), 13(a) and 14(a), when the petal antenna 120 detects input light, the petal antenna 120 may represent the input light as three-phase amplitude values $A_1$, $A_2$, and $A_3$, corresponding to divided three phase sections, through the petal patterns 130, 140, and 150. The first petal pattern 130 may detect the first phase section from the input light, and may represent the input light as the first amplitude value $A_1$ corresponding to the first phase section. The second petal pattern 140 may detect the second phase section, delayed by 120° from the first phase section, from the input light, and may represent the input light as the second amplitude value $A_2$ corresponding to the second phase section. The third petal pattern 150 may detect the third phase section, delayed by 120° from the second phase section, from the input light, and may represent the input light as the third amplitude value $A_3$ corresponding to the third phase section.

Accordingly, the petal patterns 130, 140, and 150 of the active complex spatial light modulation apparatus 100 can represent the amplitude values $A_1$, $A_2$, and $A_3$ by combining them into a single complex value. Accordingly, a holographic display can display an ultra-low noise image using the active complex spatial light modulation apparatus 100, as shown in FIGS. 12(b), 13(b) and 14(b). That is, the holographic display can display an image clearly without noise.

The active complex spatial light modulation apparatus 100 according to various embodiments is for an ultra-low noise holographic display, and may include the substrate 110 and the petal antenna 120 including the three petal patterns 130, 140, and 150 arranged on the substrate 110, dividing a complex plane into three phase sections, and modulating input light into three-phase amplitude values $A_1$, $A_2$, and $A_3$ corresponding to the phase sections.

According to various embodiments, the active complex spatial light modulation apparatus 100 may be implemented in a pixel structure form.

According to various embodiments, the petal antenna 120 may have a point symmetry shape on the basis of the center point C of the petal antenna 120.

According to various embodiments, the petal patterns 130, 140, and 150 may intersect at the center point C.

According to various embodiments, each of the petal patterns 130, 140, and 150 may have a point symmetry shape on the basis of the center point C.

According to various embodiments, the petal patterns 130, 140, and 150 may be mutually tilted by 120°.

According to various embodiments, each of the petal patterns 130, 140, and 150 may include at least two petal elements arranged in a point symmetry form on the basis of the center point C.

According to an embodiment, at least two of the petal elements may be interconnected at the center point C.

According to another embodiment, at least two of the petal elements may be spaced apart from each other with the center point C interposed therebetween.

According to various embodiments, each of the amplitude values $A_1$, $A_2$, and $A_3$ may be adjusted based on at least any one of the width or length of each of the petal patterns 130, 140, and 150.

An operating method of the active complex spatial light modulation apparatus 100 according to various embodiments may include detecting, by the petal antenna 120 including the three petal patterns 130, 140, and 150 arranged on the substrate 110, light input to the center point of the petal antenna 120, and modulating, by the petal antenna 120, the input light into three-phase amplitude values $A_1$, $A_2$, and $A_3$ corresponding to three phase sections divided from a complex plane through the petal patterns 130, 140, and 150.

According to various embodiments, each of the amplitude values may be adjusted based on transmittance of a display pixel by attaching an active amplitude modulation display pixel to each of the petal patterns.

According to various embodiments, in the active complex spatial light modulation apparatus 100, the three petal patterns 130, 140, and 150 divide a complex plane into three phase sections, and may represent the input light amplitude values $A_1$, $A_2$, and $A_3$ corresponding to the phase sections. Accordingly, the phase and amplitude of light can be modulated at the same time by the petal patterns. Accordingly, a holographic display can display an image without noise. As a result, the holographic display can display an image clearly without noise even without a filtering optical system.

According to various embodiments, in the active complex spatial light modulation apparatus, three petal patterns can divide a complex plane into three phase sections, and can represent the input light amplitude values corresponding to the phase sections. Accordingly, the phase and amplitude of light can be modulated at the same time by the petal patterns. Accordingly, a holographic display can display an image without noise. As a result, the holographic display can display an image clearly without noise even without a filtering optical system.

Although various embodiments of this document have been described, this document may be modified in various ways without departing from the scope of various embodiments of this document. Accordingly, the scope of various embodiments of this document should not be limited to the above-described embodiments, but should be defined by not only the claims, but equivalents thereof.

What is claimed is:

1. An active complex spatial light modulation apparatus for an ultra-low noise holographic display, the apparatus comprising:
    a substrate including a first surface to which an input light is incident and a second surface through which the input light is transmitted, the second surface facing the first surface, the substrate being formed of a silicon dioxide material; and
    a petal antenna comprising three petal patterns arranged directly on the second surface of the substrate such that the input light is input from the substrate to the petal antenna, dividing a complex plane into three phase sections, and modulating the input light passing through the second surface into three-phase amplitude values corresponding to the phase sections,
    wherein the petal antenna has a point symmetry shape based on a center point of the petal antenna,
    wherein each of the petal patterns comprises at least two petal elements arranged in a point symmetry form based on the center point,
    wherein at least two of the petal elements are spaced apart from each other with the center point interposed between the at least two petal elements,
    wherein a first petal pattern of the three petal patterns detects a first phase section from the input light, and represents the input light as a first amplitude value corresponding to the first phase section,
    wherein a second petal pattern of the three petal patterns detects a second phase section from the input light, and represents the input light as a second amplitude value corresponding to the second phase section,
    wherein a third petal pattern of the three petal patterns detects a third phase section from the input light, and represents the input light as a third amplitude value corresponding to the third phase section, and
    wherein the first amplitude value is determined based on the size of the first petal pattern, the second amplitude value is determined based on the size of the second petal pattern, and the third amplitude value is determined based on the size of the third petal pattern.

2. The apparatus of claim 1, wherein the petal patterns are mutually tilted by 60°.

3. The apparatus of claim 1, wherein each of the amplitude values is adjusted based on at least any one of a width or length of each of the petal patterns.

4. An operating method of an active complex spatial light modulation apparatus for an ultra-low noise holographic display, the operating method comprising:
    detecting, by a petal antenna comprising three petal patterns arranged on a substrate formed of a silicon dioxide material and including a first surface to which an input light is incident and a second surface through which the input light is transmitted, the second surface facing the first surface, the input light passing through the second surface and input to a center point of the petal antenna;

modulating, by the petal antenna, the input light into three-phase amplitude values corresponding to three phase sections divided from a complex plane through the petal patterns, wherein the petal antenna has a point symmetry shape based on the center point and is arranged directly on the second surface of the substrate such that the input light is input from the substrate to the petal antenna, wherein each of the petal patterns comprises at least two petal elements arranged in a point symmetry form based on the center point, wherein at least any two of the petal elements are spaced apart from each other with the center point interposed between the at least two petal elements, wherein a first petal pattern of the three petal patterns detects a first phase section from the input light, and represents the input light as a first amplitude value corresponding to the first phase section, wherein a second petal pattern of the three petal patterns detects a second phase section from the input light, and represents the input light as a second amplitude value corresponding to the second phase section, wherein a third petal pattern of the three petal patterns detects a third phase section from the input light, and represents the input light as a third amplitude value corresponding to the third phase section, and wherein the first amplitude value is determined based on the size of the first petal pattern, the second amplitude value is determined based on the size of the second petal pattern, and the third amplitude value is determined based on the size of the third petal pattern.

5. The method of claim 4, wherein the petal patterns are mutually tilted by 60°.

6. The method of claim 4, wherein each of the amplitude values is adjusted based on at least any one of a width or length of each of the petal patterns.

7. The method of claim 4, wherein each of the amplitude values is adjusted based on transmittance of a display pixel by attaching an active amplitude modulation display pixel to each of the petal patterns.

8. A pixel structure of an active complex spatial light modulation apparatus for an ultra-low noise holographic display, the structure comprising:

a substrate including a first surface to which an input light is incident and a second surface through which the input light is transmitted, the second surface facing the first surface, the substrate being formed of a silicon dioxide material;

a petal antenna comprising three petal patterns arranged directly on the second surface of the substrate such that the input light is input from the substrate to the petal antenna, dividing a complex plane into three phase sections, and modulating the input light passing through the second surface into three-phase amplitude values corresponding to the phase sections, wherein the petal antenna has a point symmetry shape based on a center point of the petal antenna, wherein each of the petal patterns comprises at least two petal elements arranged in a point symmetry form based on the center point, wherein at least two of the petal elements are spaced apart from each other with the center point interposed between the at least two petal elements, wherein a first petal pattern of the three petal patterns detects a first phase section from the input light, and represents the input light as a first amplitude value corresponding to the first phase section, wherein a second petal pattern of the three petal patterns detects a second phase section from the input light, and represents the input light as a second amplitude value corresponding to the second phase section, wherein a third petal pattern of the three petal patterns detects a third phase section from the input light, and represents the input light as a third amplitude value corresponding to the third phase section, and wherein the first amplitude value is determined based on the size of the first petal pattern, the second amplitude value is determined based on the size of the second petal pattern, and the third amplitude value is determined based on the size of the third petal pattern.

* * * * *